July 4, 1933. R. C. EMMONS 1,916,609
UNIVERSAL STAGE FOR MICROSCOPES
Filed Sept. 23, 1931 3 Sheets-Sheet 1

RICHARD C. EMMONS
INVENTOR

BY *J. A. Ellestad*
ATTORNEY

July 4, 1933.                R. C. EMMONS                1,916,609
UNIVERSAL STAGE FOR MICROSCOPES
Filed Sept. 23, 1931        3 Sheets-Sheet 2

RICHARD C. EMMONS
INVENTOR

BY *J. A. Ellestad*

ATTORNEY

July 4, 1933.  R. C. EMMONS  1,916,609

UNIVERSAL STAGE FOR MICROSCOPES

Filed Sept. 23, 1931  3 Sheets-Sheet 3

RICHARD C. EMMONS
INVENTOR

BY *J. A. Ellestad*
ATTORNEY

Patented July 4, 1933

1,916,609

UNITED STATES PATENT OFFICE

RICHARD C. EMMONS, OF MADISON, WISCONSIN, ASSIGNOR TO BAUSCH & LOMB OPTICAL COMPANY, OF ROCHESTER, NEW YORK, A CORPORATION OF NEW YORK

UNIVERSAL STAGE FOR MICROSCOPES

Application filed September 23, 1931. Serial No. 564,548.

This invention relates to optical instruments and more particularly it has reference to a universal stage which is used on a microscope for studying, measuring and determining various optical characteristics of crystals.

The universal stage is attached to the rotatable stage of a petrographic microscope and small crystals or crystal sections are then mounted on the universal stage. When thusly mounted, the crystal can be oriented so that its optical axis coincides with the optical axis of the microscope and so permits measurement of the optic angle, extinction angle, axial dispersion, sign, change of refractive index with rotation, optic orientation and accurate directions of light transmission for purpose of measuring refractive index. The various orientations of the crystal are made possible since the structure of the universal stage permits of adjustments and rotations about a plurality of axes. With the universal stages of the prior art it is possible to orient and adjust a crystal about four different axes. Although such a stage has been known for years and its utility has always been acknowledged, petrographers have been very slow to adopt it for use because the stage is complicated and the analysis of results requires laborious and cumbersome graphical procedures.

One of the objects of my invention is to provide an improved universal stage which can be used efficiently and conveniently for the determination and measurement of various optical characteristics of crystals. Another object is to provide a universal stage having means whereby a crystal may be rotated on two mutually perpendicular and horizontal axes after the crystal has been oriented with one of the axes of the optic indicatrix vertical. Still another object is to provide a universal stage having five axes of rotation. To these and other ends the invention resides in certain novel features of construction, arrangement and combination of parts as will hereinafter be more fully explained and pointed out in the appended claims.

Referring to the drawings.

Figure 1:
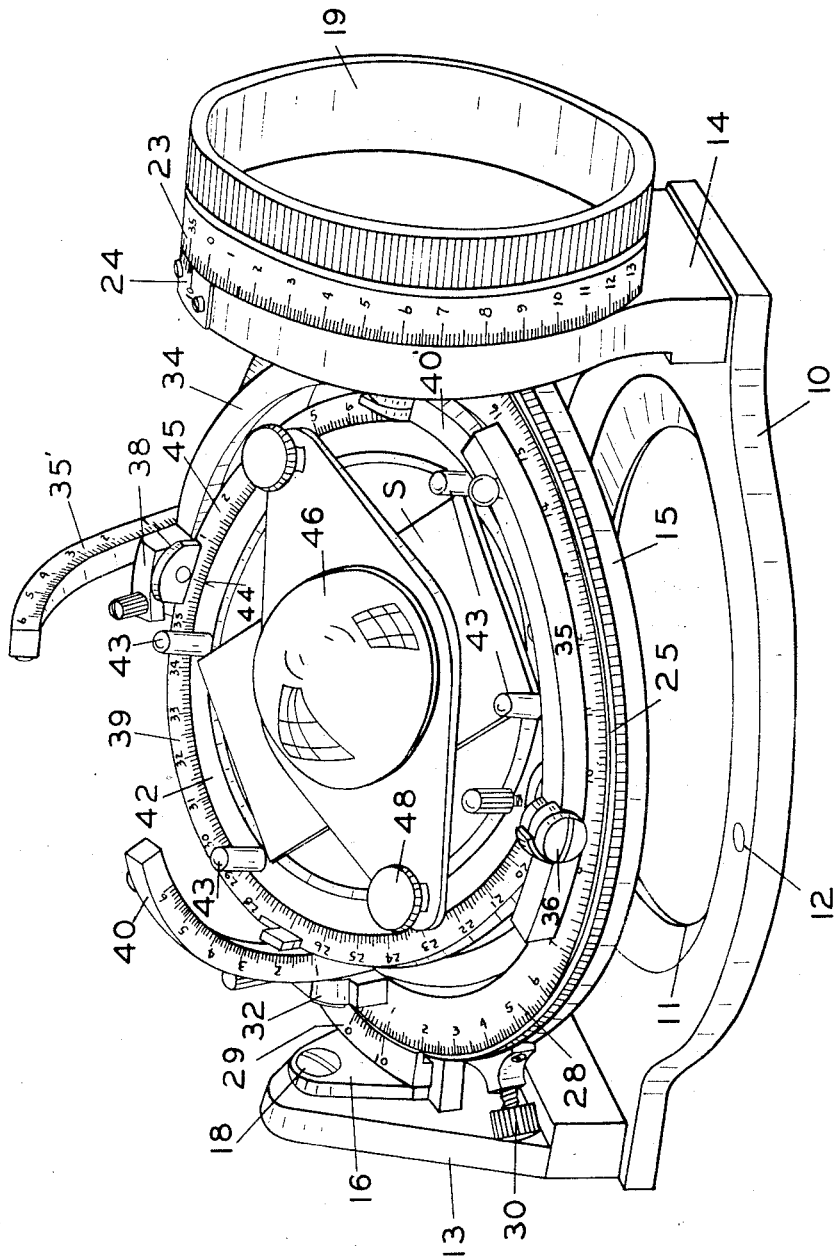
Fig. 1 is a perspective view of my improved universal stage.
Figure 3:
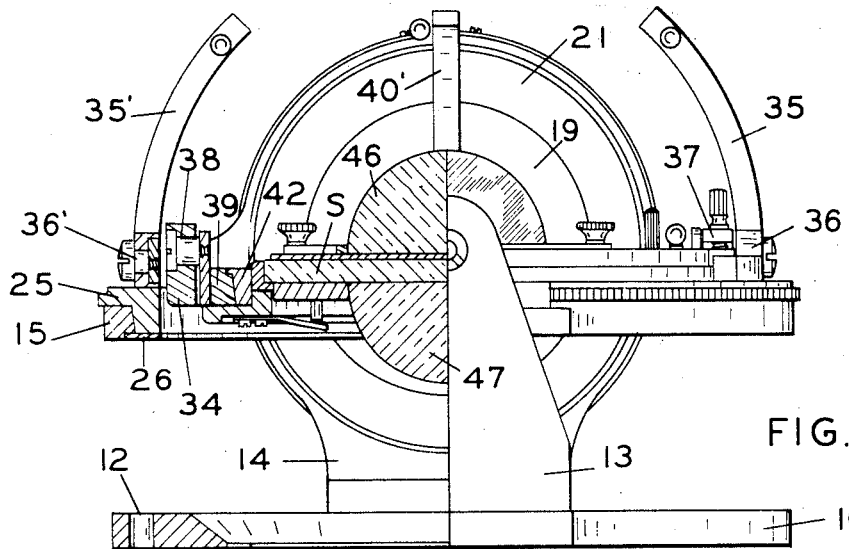
Fig. 3 is an end elevation, with parts in section, as seen from the left of Fig. 2.
Figure 2:
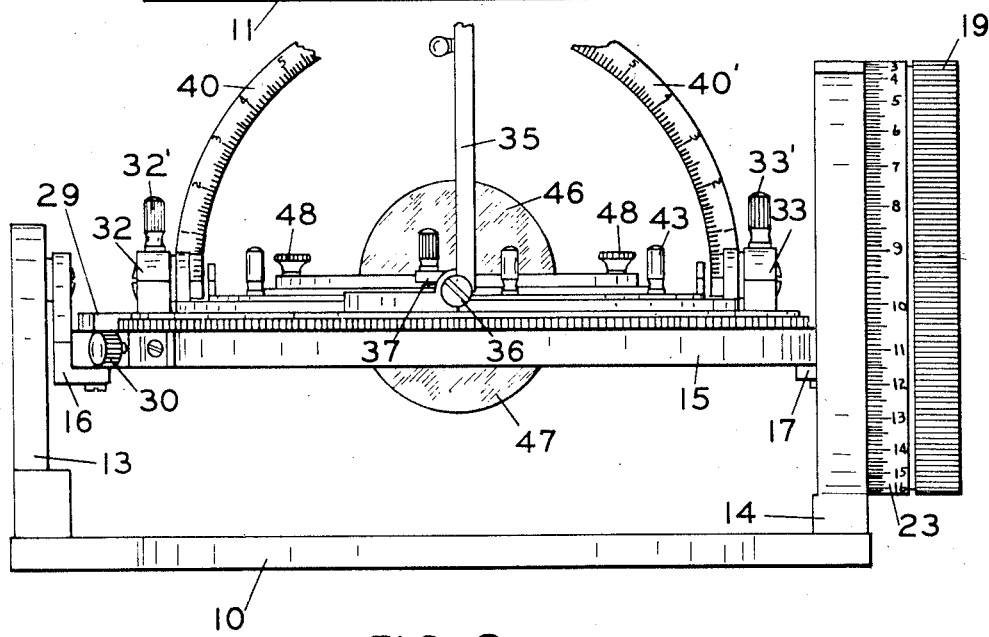
Fig. 2 is a side elevation with parts in a horizontal position and the graduated arcs vertical.
Figure 4:
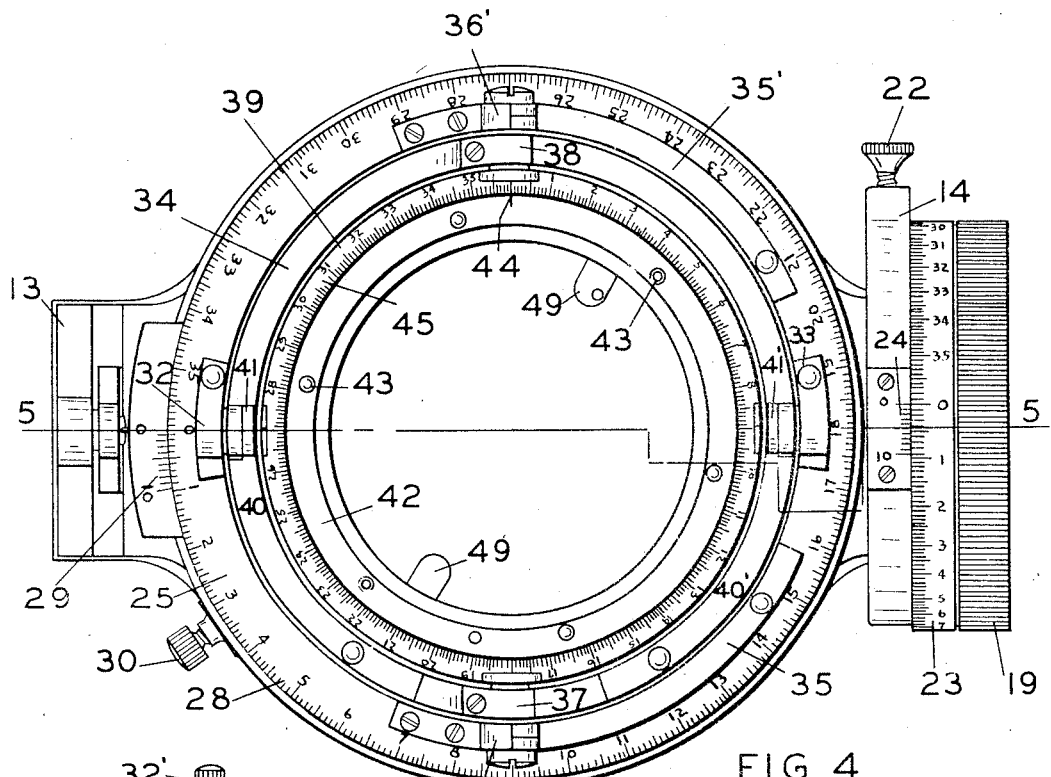
Fig. 4 is a top plan view with the hemispheres removed and the graduated arcs in a horizontal position.
Figure 6:
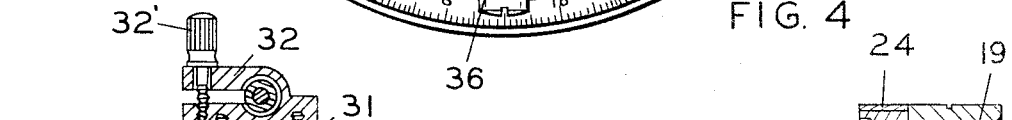
Fig. 6 is a sectional view of a detail.
Figure 5:
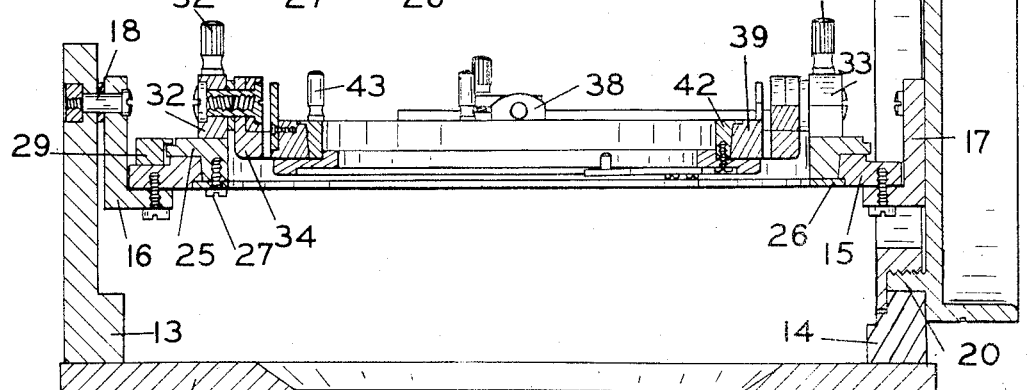
Fig. 5 is a sectional view taken on line 5—5 of Fig. 4.

One embodiment of my invention is shown in the drawings wherein 10 indicates a base having a centrally disposed opening 11 adapted to be positioned over the opening in the stage of a petrographic microscope. The universal stage may be detachably secured to the microscope stage by suitable screws which pass through openings 12 in the base 10. Secured to base 10 are the two vertical brackets 13 and 14 between which the support ring 15 is pivotally mounted to turn about a horizontal axis. Secured to ring 15 are the right angled members 16 and 17, the first of which is pivotally mounted on screw 18 attached to bracket 13 while the second member 17 is secured to a bushing 19 which is rotatably mounted in an opening 20 in bracket 14 and held in place by a threaded collar 21. The support ring 15 is thus mounted to turn about a horizontal axis which passes through the centers of screw 18 and bushing 19. The support ring 15 may be selectively locked in adjusted position by means of set screw 22 and the angular position of the support ring may be determined by means of the scale 23 and the cooperating vernier scale 24 fixed to the bracket 14.

Rotatably mounted on support ring 15 is the outer graduated ring 25 which is held in place by a retaining ring 26 secured to its under side by screws 27. The angular position of ring 25 may be determined by its scale 28 and cooperating vernier scale 29. The graduated ring 25 can be selectively locked against rotation with respect to support ring 15 by means of a set screw 30. Secured to outer graduated ring 25 by screws 31 are the two split bearing members 32 and 33 having the two tension screws 32' and 33', respectively. Between these two bearings there is pivotally mounted the swing ring 34, the angular position of which may be determined from the two graduated arcs 35 and 35' which are hingedly connected to the top of the outer graduated ring 25 at 36 and 36', respectively.

The swing ring 34 carries the pair of bearing members 37 and 38 which are positioned at right angles to the bearing members 32 and 33. Pivotally mounted between the bearing members 37 and 38 is the inner graduated ring 39, the angular position of which may be determined by the graduated arcs 40 and 40' which are hingedly connected at 41 and 41', respectively, to the swing ring 34. Rotatably mounted within the inner graduated ring 39 is the stage ring 42 having the four upright pins 43 between which a specimen slide S may be positioned. The ring 42 carries an index line 44 which cooperates with the scale 45 on ring 39 to indicate the angular position of the stage ring 42. The upper and lower glass hemispheres 46 and 47 can be detachably secured to the stage ring by means of the screws 48 and the clips 49.

My improved universal stage has five different axes of rotation namely, rotation of the stage ring 42 about a vertical axis; rotation of the inner graduated ring 39 about a horizontal axis; rotation of the swing ring 34 about a horizontal axis at right angles to the first named horizontal axis; rotation of the outer graduated ring 25 about a vertical axis and rotation of the support ring 15 about a horizontal axis. The entire universal stage may also be rotated by turning the microscope stage. By means of my improved universal stage I am able to rotate a crystal on two mutually perpendicular and horizontal axes after the crystal has been oriented with one of the axes of the optic indicatrix vertical. A detailed description of the method and technique for using my improved stage appears in my article published on pages 441–461 in the American Mineralogist, vol. 14, No. 12, December 1929. Various modifications can obviously be made without departing from the spirit of my invention as pointed out in the appended claims.

I claim:

1. A universal stage comprising a base adapted to be attached to a microscope stage, a support ring pivotally mounted on said base, an outer ring rotatably mounted on said support ring, a swing ring pivotally mounted on said outer ring, an inner ring pivotally mounted on said swing ring, a stage ring rotatably mounted on said inner ring and means for holding a specimen on said stage ring.

2. A universal stage for use in examining crystals, said stage comprising a base, adapted to be attached to a microscopic, a support ring pivotally mounted on said base to turn about a horizontal axis, an outer ring rotatably mounted on said support ring, a swing ring pivotally mounted on said outer ring to turn about a horizontal axis, an inner ring pivotally mounted on said swing ring to turn about a horizontal axis which lies in a plane perpendicular to said second named horizontal axis and a stage ring rotatably mounted on said inner ring.

3. A universal stage for use in examining crystals and the like comprising a base adapted to be secured to the stage of a microscope, a support member mounted on said base to turn about an axis, an outer member rotatably mounted on said support member, a swing member pivotally mounted on said outer member, an inner member pivotally mounted on said swing member, a stage member rotatably mounted on said inner member, means for holding a crystal on said stage member and separate scale means for indicating the angular movement of each of said members.

4. A universal stage of the character described comprising a base adapted to be detachably secured to the stage of a microscope, a support ring pivotally mounted on said base to turn about a horizontal axis, an outer ring rotatably mounted on said support ring, a swing ring pivotally mounted on said outer ring to turn about an axis, an inner ring pivotally mounted on said swing ring to turn about an axis lying in a plane which is perpendicular to the plane of the axis about which said swing ring turns, a stage ring rotatably mounted on said inner ring, means for holding a specimen on said stage ring and separate scale means for indicating the angular movement of each of said rings.

RICHARD C. EMMONS.